(12) United States Patent
Anniballi et al.

(10) Patent No.: US 11,394,478 B2
(45) Date of Patent: *Jul. 19, 2022

(54) CLOUD CALLOUT IDENTIFICATION OF UNKNOWN BROADCAST SIGNATURES BASED ON PREVIOUSLY RECORDED BROADCAST SIGNATURES

(71) Applicant: iHeartMedia Management Services, Inc., San Antonio, TX (US)

(72) Inventors: Dyon Anniballi, Wayne, PA (US); Philippe Generali, Scarsdale, NY (US)

(73) Assignee: iHeartMedia Management Services, Inc., San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/005,968

(22) Filed: Aug. 28, 2020

(65) Prior Publication Data

US 2020/0396014 A1    Dec. 17, 2020

Related U.S. Application Data

(63) Continuation of application No. 16/593,112, filed on Oct. 4, 2019, now Pat. No. 10,763,983, which is a
(Continued)

(51) Int. Cl.
*H04H 20/12*  (2008.01)
*H04H 60/43*  (2008.01)
(Continued)

(52) U.S. Cl.
CPC ............. *H04H 20/12* (2013.01); *G06F 21/32* (2013.01); *H04H 60/43* (2013.01); *H04H 60/44* (2013.01);
(Continued)

(58) Field of Classification Search
CPC ............. H04L 9/3231; H04L 63/0861; H04L 63/0869; H04L 65/403; H04H 20/12;
(Continued)

(56) References Cited

U.S. PATENT DOCUMENTS

| | | |
|---|---|---|
| 5,016,159 A | 5/1991 | Maruyama |
| 5,437,050 A | 7/1995 | Lamb et al. |

(Continued)

FOREIGN PATENT DOCUMENTS

| | | |
|---|---|---|
| WO | 0162004 A2 | 8/2001 |
| WO | 0211123 A2 | 2/2002 |

(Continued)

OTHER PUBLICATIONS

Patel, Kuner; Your Smartphone is Listening in While you Watch TV; Advertising Age, Jul. 18, 2001, http:f/adage.com/print/228760.

*Primary Examiner* — Dominic E Rego
(74) *Attorney, Agent, or Firm* — Garlick & Markison; Edward Marshall

(57) ABSTRACT

Broadcast signatures (fingerprints) from different sources are compared to distinguish between a known base media item and unknown versions of the known base media item, without prior storage of the unknown altered versions of the known base media item. Field recorders collect and store in buffers signatures found within portions of sequential broadcast content. Mobile devices (users) collect unknown signatures while recording broadcast content. Using a cloud callout routine, the mobile device requests a comparison between the collected unknown signatures and the field recorded signatures. Potential matches can be loose matches, strict matches or comparisons between failed loose comparisons.

20 Claims, 10 Drawing Sheets

Related U.S. Application Data continuation of application No. 15/848,472, filed on Dec. 20, 2017, now Pat. No. 10,461,870, which is a continuation of application No. 15/281,463, filed on Sep. 30, 2016, now Pat. No. 9,860,000, which is a continuation of application No. 14/953,694, filed on Nov. 30, 2015, now Pat. No. 9,461,759, which is a continuation-in-part of application No. 14/690,953, filed on Apr. 20, 2015, now Pat. No. 9,203,538, which is a continuation of application No. 14/157,778, filed on Jan. 17, 2014, now Pat. No. 9,014,615, which is a continuation of application No. 13/221,237, filed on Aug. 30, 2011, now Pat. No. 8,639,178.

(51) Int. Cl.
    H04H 60/44     (2008.01)
    H04H 60/45     (2008.01)
    H04L 29/06     (2006.01)
    H04L 9/40      (2022.01)
    H04L 9/32      (2006.01)
    G06F 21/32     (2013.01)
    H04H 60/56     (2008.01)
    H04L 65/403    (2022.01)

(52) U.S. Cl.
    CPC ............ *H04H 60/45* (2013.01); *H04H 60/56* (2013.01); *H04L 9/3231* (2013.01); *H04L 63/0861* (2013.01); *H04L 63/0869* (2013.01); *H04L 65/403* (2013.01); *H04H 2201/90* (2013.01)

(58) Field of Classification Search
    CPC ........ H04H 60/43; H04H 60/44; H04H 60/45; H04H 60/56; H04H 2201/90; G06F 21/32
    See application file for complete search history.

(56) References Cited

U.S. PATENT DOCUMENTS

| | | |
|---|---|---|
| 5,541,921 A | 7/1996 | Swenson et al. |
| 5,574,972 A | 11/1996 | Hulbert |
| 6,067,066 A | 5/2000 | Kubota et al. |
| 6,137,796 A | 10/2000 | Derango et al. |
| 6,415,323 B1 | 7/2002 | McCanne et al. |
| 6,785,786 B1 | 8/2004 | Gold et al. |
| 6,834,308 B1 | 12/2004 | Ikezoye et al. |
| 6,990,453 B2 | 1/2006 | Wang et al. |
| 7,174,293 B2 | 2/2007 | Kenyon et al. |
| 7,194,752 B1 | 3/2007 | Kenyon et al. |
| 7,231,561 B2 | 6/2007 | Ziegler et al. |
| 7,346,512 B2 | 3/2008 | Li-Chun Wang et al. |
| 7,359,889 B2 | 4/2008 | Wang et al. |
| 7,500,007 B2 | 3/2009 | Ikezoye et al. |
| 7,627,477 B2 | 12/2009 | Wang et al. |
| 7,739,062 B2 | 6/2010 | Wang |
| 7,783,489 B2 | 8/2010 | Kenyon et al. |
| 7,788,279 B2 | 8/2010 | Mohajer et al. |
| 7,836,171 B2 | 11/2010 | Altman |
| 7,853,664 B1 | 12/2010 | Wang et al. |
| 7,865,368 B2 | 1/2011 | Li-Chun Wang et al. |
| 7,870,574 B2 | 1/2011 | Kenyon et al. |
| 7,881,657 B2 | 2/2011 | Wang et al. |
| 7,917,645 B2 | 3/2011 | Ikezoye et al. |
| 8,078,758 B1 | 12/2011 | Callon |
| 8,295,853 B2 | 10/2012 | Heikkila et al. |
| 8,639,178 B2 | 1/2014 | Anniballi et al. |
| 8,949,872 B2 | 2/2015 | Slaney et al. |
| 9,014,615 B2 | 4/2015 | Anniballi et al. |
| 9,185,458 B2 | 11/2015 | Jacoby |
| 9,418,136 B1 | 8/2016 | Gudmundsson et al. |
| 9,497,035 B2 | 11/2016 | Dai et al. |
| 9,554,092 B2 | 1/2017 | Weinblatt |
| 9,668,006 B2 | 5/2017 | Garg et al. |
| 2002/0072982 A1 | 6/2002 | Barton et al. |
| 2002/0126882 A1 | 9/2002 | Funahashi |
| 2002/0161074 A1 | 10/2002 | Sasaki et al. |
| 2002/0161741 A1 | 10/2002 | Wang et al. |
| 2002/0191821 A1* | 12/2002 | Bornes ............... G06V 40/1347 382/124 |
| 2003/0097408 A1 | 5/2003 | Kageyama et al. |
| 2003/0128275 A1 | 7/2003 | Maguire |
| 2003/0138135 A1* | 7/2003 | Chung ................... G07C 13/00 382/119 |
| 2003/0157966 A1 | 8/2003 | Sato et al. |
| 2003/0159146 A1 | 8/2003 | Kim |
| 2003/0204439 A1 | 10/2003 | Cullen |
| 2004/0199387 A1 | 10/2004 | Wang et al. |
| 2005/0114794 A1 | 5/2005 | Grimes et al. |
| 2005/0267817 A1 | 12/2005 | Barton et al. |
| 2005/0270140 A1 | 12/2005 | Oh |
| 2006/0019751 A1 | 1/2006 | Garcia |
| 2006/0104224 A1* | 5/2006 | Singh .................... H04W 12/06 370/310 |
| 2006/0245625 A1 | 11/2006 | Tichelaar et al. |
| 2006/0262887 A1 | 11/2006 | Lombardo et al. |
| 2006/0294537 A1 | 12/2006 | Weinblatt |
| 2007/0014377 A1 | 1/2007 | Pirak et al. |
| 2007/0081070 A1 | 4/2007 | Wu et al. |
| 2007/0186232 A1 | 8/2007 | Chen et al. |
| 2008/0060038 A1* | 3/2008 | Stallings ............ H04N 7/17318 348/E7.071 |
| 2008/0082510 A1 | 4/2008 | Wang et al. |
| 2008/0091845 A1 | 4/2008 | Mills et al. |
| 2008/0148316 A1* | 6/2008 | Kang ..................... H04H 60/40 725/40 |
| 2008/0205506 A1 | 8/2008 | Hickey |
| 2008/0306962 A1 | 12/2008 | Grannan et al. |
| 2008/0307108 A1 | 12/2008 | Yan et al. |
| 2008/0313146 A1 | 12/2008 | Wong et al. |
| 2009/0012849 A1 | 1/2009 | Penrose Barton et al. |
| 2009/0103651 A1 | 4/2009 | Lahtonen et al. |
| 2009/0119315 A1 | 5/2009 | Kasbarian |
| 2009/0183215 A1 | 7/2009 | McCartie et al. |
| 2009/0183220 A1 | 7/2009 | Amento et al. |
| 2009/0298485 A1 | 12/2009 | Lee et al. |
| 2010/0030775 A1 | 2/2010 | Mohajer et al. |
| 2010/0049741 A1 | 2/2010 | Harrison |
| 2010/0145708 A1 | 6/2010 | Master et al. |
| 2010/0165905 A1 | 7/2010 | Kanazawa et al. |
| 2010/0197320 A1 | 8/2010 | Ulrich et al. |
| 2010/0285849 A1 | 11/2010 | Porjo et al. |
| 2011/0021136 A1 | 1/2011 | Patsiokas et al. |
| 2011/0071838 A1 | 3/2011 | Wang et al. |
| 2011/0078719 A1 | 3/2011 | Kenyon et al. |
| 2011/0099197 A1 | 4/2011 | Wang et al. |
| 2011/0153621 A1 | 6/2011 | Beltas et al. |
| 2011/0276157 A1 | 11/2011 | Wang et al. |
| 2013/0290502 A1 | 10/2013 | Bilobrov et al. |
| 2014/0059065 A1 | 2/2014 | Cortes et al. |
| 2014/0093144 A1 | 4/2014 | Feekes |
| 2014/0358938 A1 | 12/2014 | Billmaier et al. |
| 2015/0287416 A1 | 10/2015 | Brands et al. |
| 2017/0310721 A1 | 10/2017 | Draznin et al. |

FOREIGN PATENT DOCUMENTS

| | | |
|---|---|---|
| WO | 0227600 | 4/2002 |
| WO | 02061652 A2 | 8/2002 |
| WO | 03091990 A2 | 6/2003 |
| WO | 2005079499 A2 | 9/2005 |
| WO | 2006012241 A2 | 2/2006 |
| WO | 2007059420 A2 | 5/2007 |
| WO | 2008042953 A1 | 4/2008 |

\* cited by examiner

CLOUD CALLOUT IDENTIFICATION OF UNKNOWN BROADCAST SIGNATURES BASED ON PREVIOUSLY RECORDED BROADCAST SIGNATURES

CROSS REFERENCE TO RELATED PATENTS

The present U.S. Utility patent application claims priority pursuant to 35 U.S.C. § 120 as a continuation of U.S. Utility application Ser. No. 16/593,112, entitled, "IDENTIFICATION OF UNKNOWN ALTERED VERSIONS OF A KNOWN BASE MEDIA ITEM," filed Oct. 4, 2019, scheduled to issue as U.S. Pat. No. 10,763,983 on Sep. 1, 2020, which is a continuation of U.S. Utility application Ser. No. 15/848,472, entitled, "PARALLEL IDENTIFICATION OF MEDIA SOURCE," filed Dec. 20, 2017, now U.S. Pat. No. 10,461,870, which is a continuation of U.S. Utility application Ser. No. 15/281,463, entitled, "IDENTIFICATION OF CHANGED BROADCAST MEDIA ITEMS," filed Sep. 30, 2016, now U.S. Pat. No. 9,860,000, which is a continuation of U.S. Utility application Ser. No. 14/953,694, entitled, "IDENTIFICATION OF CHANGED BROADCAST MEDIA ITEMS," filed Nov. 30, 2015, now U.S. Pat. No. 9,461,759, which is a continuation-in-part of U.S. Utility application Ser. No. 14/690,953, entitled, "BROADCAST SOURCE IDENTIFICATION BASED ON MATCHING BROADCAST SIGNAL FINGERPRINTS," filed Apr. 20, 2015, now U.S. Pat. No. 9,203,538, which is a continuation of U.S. Utility application Ser. No. 14/157,778, entitled, "BROADCAST SOURCE IDENTIFICATION BASED ON MATCHING BROADCAST SIGNAL FINGERPRINTS," filed Jan. 17, 2014, now U.S. Pat. No. 9,014,615, which is a continuation of U.S. Utility application Ser. No. 13/221,237, entitled, "BROADCAST SOURCE IDENTIFICATION BASED ON MATCHING BROADCAST SIGNAL FINGERPRINTS," filed Aug. 30, 2011, now U.S. Pat. No. 8,639,178, all of which are hereby incorporated herein by reference in their entirety and made part of the present U.S. Utility patent application for all purposes.

FIELD

The present disclosure relates generally to identifying broadcast content, and more particularly to identifying changed broadcast media items.

BACKGROUND

Current technology allows a portion of a song, movie, or other unknown content items to be identified by comparing it against a database of known content. To facilitate identification of the unknown content, it is known to generate fingerprints of both the known and unknown content items, and compare the fingerprints. These fingerprints can include audio watermarks. In cases where fingerprints are used, the database of known content is sometimes used to store fingerprints of distinct content items.

In some instances, the database storing the fingerprints of the known content is also used to store timestamps, indicating particular times at which particular items of known content were broadcast. The unknown content can also include timestamps, and by performing a two-step comparison that matches both the fingerprints and the timestamps of unknown distinct content items with the fingerprints and timestamps stored in the database of known content items, information can be deduced about a source of the unknown content item.

Currently available technology, however, requires having a comprehensive database of known content items to be compared against each unknown content item, because if an unknown content item is not included in the database of known content items, any attempt to identify the unknown content item will be unsuccessful.

Even when attempting to identify broadcast content using a fingerprint of a known media item included in the comprehensive database, it can be difficult to identify subtle changes in a broadcast content item. For example, if a fingerprint comparison is made between a media item actually broadcast and a known media item, but the media item actually broadcast has been subtly altered, the actually-broadcast media item may not be identified as a match because of the changes. For these and other reasons, currently available technology is less than ideal.

SUMMARY

Disclosed herein are various methods, systems, and devices Disclosed herein are various methods, systems, and devices that can be used to identify broadcast media items that have been subtly changed from a base media item. A substantially-continuous fingerprint representing content broadcast by a media station and a first fingerprint representing a base version of a discrete media item can be obtained, for example by capturing content from one or more transmission sources during transmission of the content, and generating a plurality of substantially continuous fingerprints. The substantially-continuous fingerprint can, in some implementations, be captured as analog content using a field recorder, and a digital fingerprint can be generated from the captured analog content.

A first comparison attempting to match, to a first degree of certainty, portions of the substantially-continuous fingerprint representing content broadcast by a media station to the first fingerprint representing a base version of a discrete media item can be performed.

Portions of the substantially-continuous fingerprint that match the first fingerprint to the first degree of certainty can be identified as loose matches. For each of the loose matches, a second comparison can be made in an attempt to match the loose matches to the first fingerprint to a second degree of certainty more stringent than the first degree of certainty. Loose matches that fail to match the first fingerprint to the second degree of certainty are designated as potentially-altered matches An attempt can then be made to match individual potentially-altered matches against other potentially-altered matches to the second degree of certainty, and if one or more of the individual potentially-altered matches matching another one or more of the other potentially-altered matches to the second degree of certainty, one or more of those matches can be flagged, and designated as a flagged match. Flagged matches generally represent discrete media items broadcast by a station, that loosely match a known, base media item but do not match it closely enough to be considered an unaltered base media item.

In at least some embodiments, a new fingerprint of the flagged match is generated, and then used to perform a third comparison attempting to match, to the first degree of certainty, portions of the substantially-continuous fingerprint to the new fingerprint of the flagged match. In various implementations, when potentially-altered matches are identified during the second comparison, the potentially-altered matches are stored in a data construct representing a pool of failed stringent matches.

In various embodiments, multiple first comparisons can be made for multiple substantially continuous fingerprints associated with multiple different broadcast media stations, and the second comparison of the loose matches can be performed across multiple different broadcast media stations, so that if multiple stations broadcast the same changed media item, that changed media item can be identified on any or all of those stations.

Either the first comparison, the second comparison, or both the first and second comparison can take into account a margin of error for broadcast artifacts.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

Figure 1:
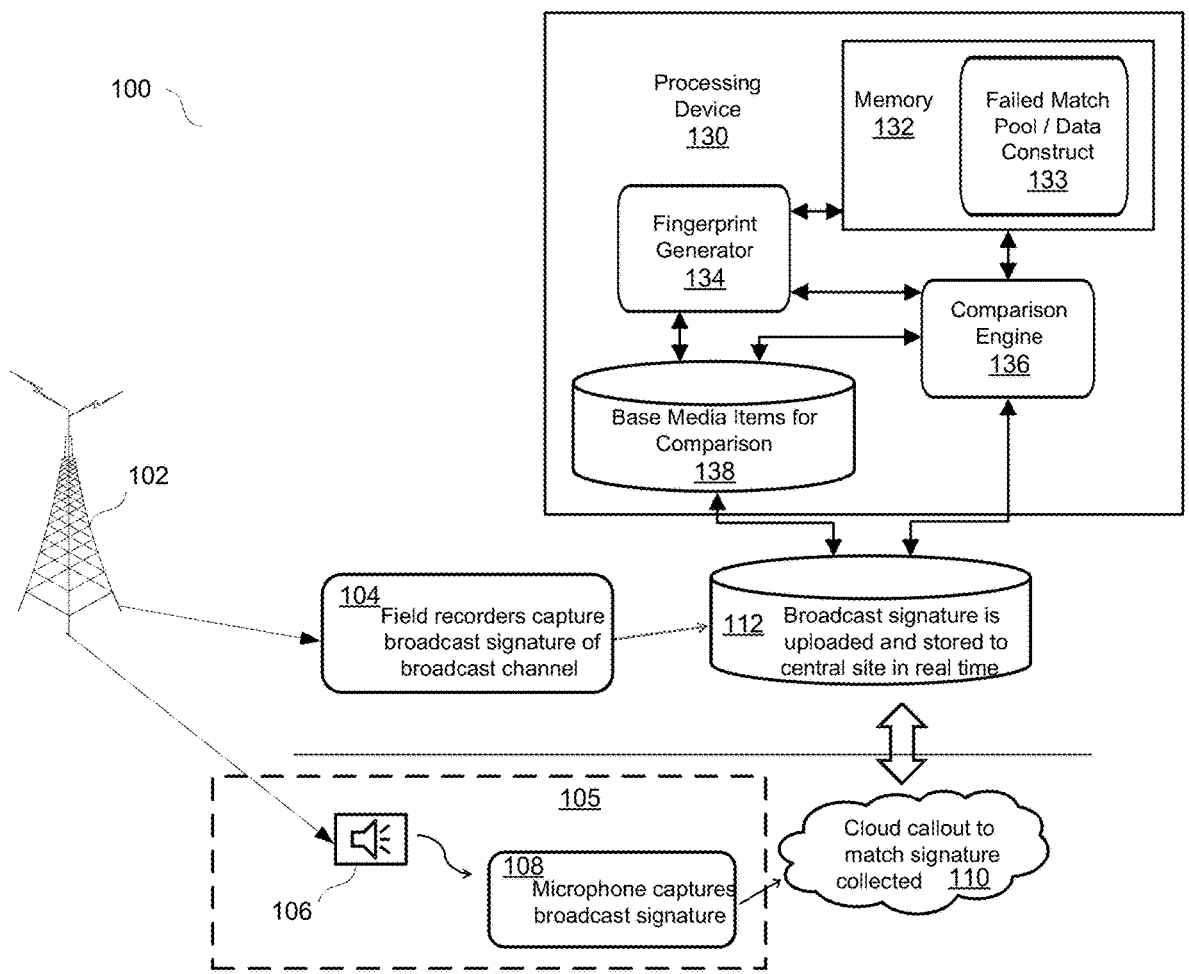
FIG. 1 is a diagram illustrating collection of known and unknown broadcast content signatures according to various embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Various implementations of the present disclosure can be used to identify changed advertisements broadcast on one or more different media stations, either concurrently or at different times during a daypart, day, week, month, season, or other period. In some situations, it can be advantageous to know when a base advertisement has been altered, and to be able to identify and track altered advertisements derived from the same base advertisement. For example, when tracking how often a particular advertisement has been broadcast, it may be desirable to count subtly altered versions of the same advertisement towards the total number of broadcast instances for reporting and billing purposes. At the same time, knowing if or when altered versions of a base advertisement are broadcast can enhance the ability to automatically track and bill advertisements across different media outlets, and to determine exactly when the altered versions began airing. Consider, for example, an advertiser that desires to air advertisements for a large annual sale beginning on November $12^{th}$. A base advertisement broadcast during October might announce that the sale begins "next month." The base advertisement can be altered for broadcast during the first week in November to announce that the sale begins, "next week." Thus, even though the bulk of the ad copy in both advertisements is identical, the advertisements themselves are not identical.

Various embodiments presented herein improve the functionality of a computing device by making it possible for the computing device to distinguish between a known "base" media item and altered versions of the base media item included in a media station's broadcast, regardless of whether the altered version is previously known to the computing device. Thus, in some embodiments, the computing device does not need to have access to the altered version of the base media item to be able to detect and track broadcasting of the altered version, the base version, or both the altered and the base version.

Unless otherwise indicated or required by context, the term "media item" as used herein refers to discrete items of programming and commercial content, including songs, shows, advertisements, fill, talent recordings, trailers, station identifiers, and the like. Although many of the examples presented herein refer primarily to advertisements, the teachings set forth herein can also be applied other media items. Various embodiments find application in and across various type of media channels, such as over-air and streaming television, and over-air and streaming radio, podcasts and other media items broadcast or downloaded via the Internet or other suitable communications network. The term "substantially continuous fingerprint," as used herein, refers generally to a digital fingerprint of all captured media content broadcast of a station over a designated period of time.

Referring now to FIG. 1, a system 100 useful for identification of a particular broadcast channel, station, or source being observed by a user will be discussed. System 100 can also be used to identify altered version of a media item, such as an advertisement, even if the altered version only includes subtle alterations. System 100 includes one or more broadcast sources 102, such as a broadcast radio station, television station, streaming video or audio channel, or other content broadcast for consumption by end-users, or others. As used herein, the term "broadcast" is intended to be interpreted in a broad sense, and includes broadcasts in various different mediums, including broadcasts made via the Internet and other communication networks, analog and digital radio frequency broadcasts such as those broadcasts made by terrestrial and satellite radio and television stations, and transmissions intended for consumption of more than one person or device made in any other suitable medium.

End-users, for example individual consumers and businesses, can use a mobile device 105, such as a tablet, personal digital assistant, mobile phone, or another device equipped with or connected to microphone 106 to record the broadcast content currently being consumed by the end-user. The broadcast content captured by microphone 106 can be analyzed to identify a broadcast signature, sometimes referred to as a fingerprint and including various representations of the broadcast content, using circuitry or a processor implementing a software module 108. The broadcast signature, or fingerprint, can be transmitted via a communication network that includes a cloud computing component 110. In some embodiments, although not specifically illustrated in FIG. 1, a device other than mobile device 105 can be used to generate the signature of the broadcast content captured by microphone 106.

At the same time the user is capturing and determining the signature of the content broadcast by broadcast source 102, field recorders 104 can be used by a monitoring service, service provider, or the like to capture a comparison signature of the same broadcast content. Thus, there are two representations of the content broadcast by broadcast source 102: a first unknown representation received by mobile device 105; and a second known representation of the same content received by field recorders 104. The comparison signature captured by field recorders 104 can be delivered to repository 112, which can be a central or regional server system, data storage site, service provider computer system, storage local to the field recorders, or another suitable data handling system. The comparison signature corresponding to the content broadcast by broadcast sources 102 is temporarily stored in a buffer, or other memory, in a continuous, sequential manner similar to the way data is stored in a buffer, for example, but not limited to, a FIFO (first-in-first-out) or LIFO (last-in-first-out) buffer. The comparison signature stored in repository 112 can then be used for comparison with the broadcast signature record by end-user's mobile device 105.

The broadcast content representations temporarily stored in repository 112 corresponds to fingerprints of essentially continuous real-time broadcast content, which includes not only signatures of discrete items like songs, videos, images, and the like, but can also include unanticipated, unscripted, or content that may be unknowable until the broadcast is generated. Note that the data stored in repository 112 is, in at least some embodiments, not simply a database of fingerprints, with records corresponding to discreet content items, although some implementations can employ a database of individual content items in addition to the continuous fingerprint described herein. Furthermore, the temporarily stored, continuous broadcast content signature can include, audio signatures of advertisements, disc jockey chatter, listener or viewer telephone calls, real-time or custom mixed audio content that may include signatures of both prerecorded songs and live content, or the like.

By generating a signature that represents the entire broadcast stream intended to be presented to a user, the broadcast signature captured by mobile device 105 can be compared to the broadcast signature recorded by field recorders 104, thereby allowing identification of a station broadcasting the content, regardless of whether an actual song can be identified based on that same information. For example, if an audio signature of a song stored in a database is compared to audio captured by an end-user's mobile device 105, the audio captured by end-users mobile device may not correlate with any song stored in a database storing signatures of discreet songs, for a number of reasons: the captured audio may include both the song and other content broadcast concurrently with that song; the captured audio may simply not be a song; or the captured audio may be audio of a song not included in the database to which is compared. But various embodiments of the present disclosure identify a broadcast radio station even when there is no match between a song stored in the database and audio captured by the end-users mobile device 105, because the audio captured by the end-users mobile device 105 is compared against audio captured by field recorders 104. Thus, the signatures recorded by both the field recorders 104 in the end-users mobile device 105 can be matched, regardless of whether the signature of audio captured by mobile device 105 corresponds to an advertisement, or not stored in a database of signatures.

System 100 also includes processing device 130, which in turn includes base item database 138, used to store fingerprints of known base media items for comparison; comparison engine 136, which performs both loose and strict comparisons between fingerprints of based media items and substantially continuous fingerprints of broadcast content captured by field recorders 104 and stored in repository 112; fingerprint generator 134, which can be used to generate fingerprints of particular portions of broadcast content as determined by comparison engine 136; and memory 132, which can include one or more data constructs 133, such as a relational database, linked table, or list used to store a pool of failed matches. The operation of processing device 130 is discussed in more detail below, in conjunction with FIG. 11.

Figure 2:
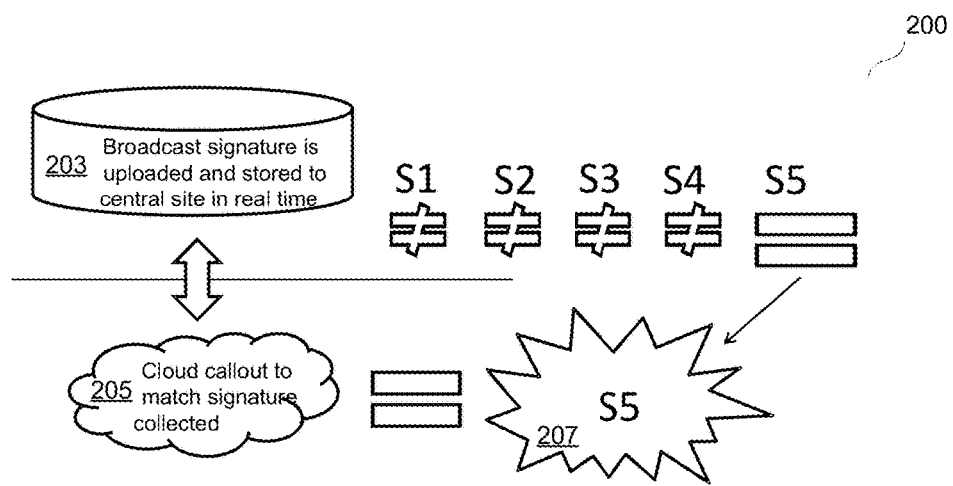
FIG. 2 is a diagram illustrating comparison of known and unknown collected broadcast signatures according to various embodiments of the present disclosure.

Referring next to FIG. 2, a system 200 that allows identification of a particular station from among multiple different broadcast stations will be discussed according to various embodiments of the present disclosure. A server 203, which may be a regionally located server, a nationally located server, a server local to a sub community, or some other computing and storage device or system, is used to buffer a desired amount of audio content from multiple different broadcast stations. In the illustrated example, server 203 includes buffered content signatures corresponding to five different radio stations, S1, S2, S3, S4, and S5. The content from each station is, in at least one embodiment, stored in a different buffer or memory location to permit parallel comparison of the signature to be identified with the signatures for each of the radio stations.

Content recorded by an end-user is delivered to a cloud callout routine 205, which compares the signature of the audio captured by the end-user with the signature of the audio captured from each of the broadcast stations S1-S5. Although a cloud callout routine 205 is illustrated, the matching of signatures can be performed at any of various computing elements, according to various system implementations.

In the example illustrated in FIG. 2, a comparison of the signature captured by the end user can be compared against each of the buffers corresponding to stations S1-S5, results in a match between the audio content recorded by the end-users mobile device and the broadcast content signature of station S5 207. In rare cases, for example where two stations in the same regional market broadcast identical content with a time delay shorter than the time-length of the signature stored in each of the buffers holding the known broadcast content, the signatures from the two stations may both match the signature of the broadcast content to be provided.

It will be appreciated that although when discussing FIGS. 1 and 2 a cloud callout module has been used for purposes of discussion, various embodiments do not require use of cloud computing techniques. For example, the comparison between the broadcast signatures of stations S1 through S5 and the broadcast signature of the recorded audio sample from the end-user could be compared at the same computing device used to buffer the broadcast signatures. In other embodiments various networked computers connected via a local area network (LAN) a wide-area network (WAN), a backbone network, in any of various wired and wireless subnetworks can be used to perform a comparison either alone or in combination with other networked computers or other devices.

In some embodiments, the station buffers S1 through S5 can be used in conjunction with fingerprints of broadcast portions from each station, or fingerprints of broadcast portions from a single station, where each broadcast portion represents a discrete media item, such as an advertisement. In some such instances, cloud callout routine 205 can be used to perform loose and stringent comparisons, and to perform the comparisons between failed loose matches, as discussed subsequently with reference to FIG. 11.

Referring again to FIG. 1, in at least one embodiment both field recorders 104 and mobile device 105 capture broadcast audio content that has already been, or is in the process of being, presented audibly, visually, or in some other human perceptible form. Still other embodiments may capture broadcast content prior to the broadcast content actually being reproduced in human perceptible form. In some such implementations, metadata and other computer readable data not intended for presentation to end-users in human perceptible form can be removed from a digital or analog broadcast signal, and the modified digital analyzed to determine a broadcast signature. As used herein, the terms "broadcast signature," "broadcast content signature," "broadcast content fingerprint," and "broadcast content representation," are generally used interchangeably to refer to a spectral or other type of analysis performed on all broadcast content intended to be reproduced in human perceptible form, e.g. audibly, visually, or the like. Generation of a fingerprint, in some embodiments, uses techniques similar to those disclosed and described in U.S. Patent Pub. No. 2008/0205506, entitled, "METHOD FOR DETERMINING THE LIKELIHOOD OF A MATCH BETWEEN SOURCE DATA AND REFERENCE DATA," which is incorporated herein by reference in its entirety.

The amount of broadcast content, or length of broadcast signatures, stored in the buffer or other memory can vary depending on the intended use of a specific implementation. For example, an implementation in which a user records a snippet of a broadcast and provides a broadcast signature of that snippet for comparison in near-real time, might employ field recorders and servers that buffer only approximately 30-60 seconds of broadcast content signatures. In other embodiments, for example where broadcast content is recorded by an end user with a DVR (digital video recorder) and viewed at some later time, a buffer of broadcast content signatures representing multiple days of broadcast content from a particular station can be maintained.

Figure 3:
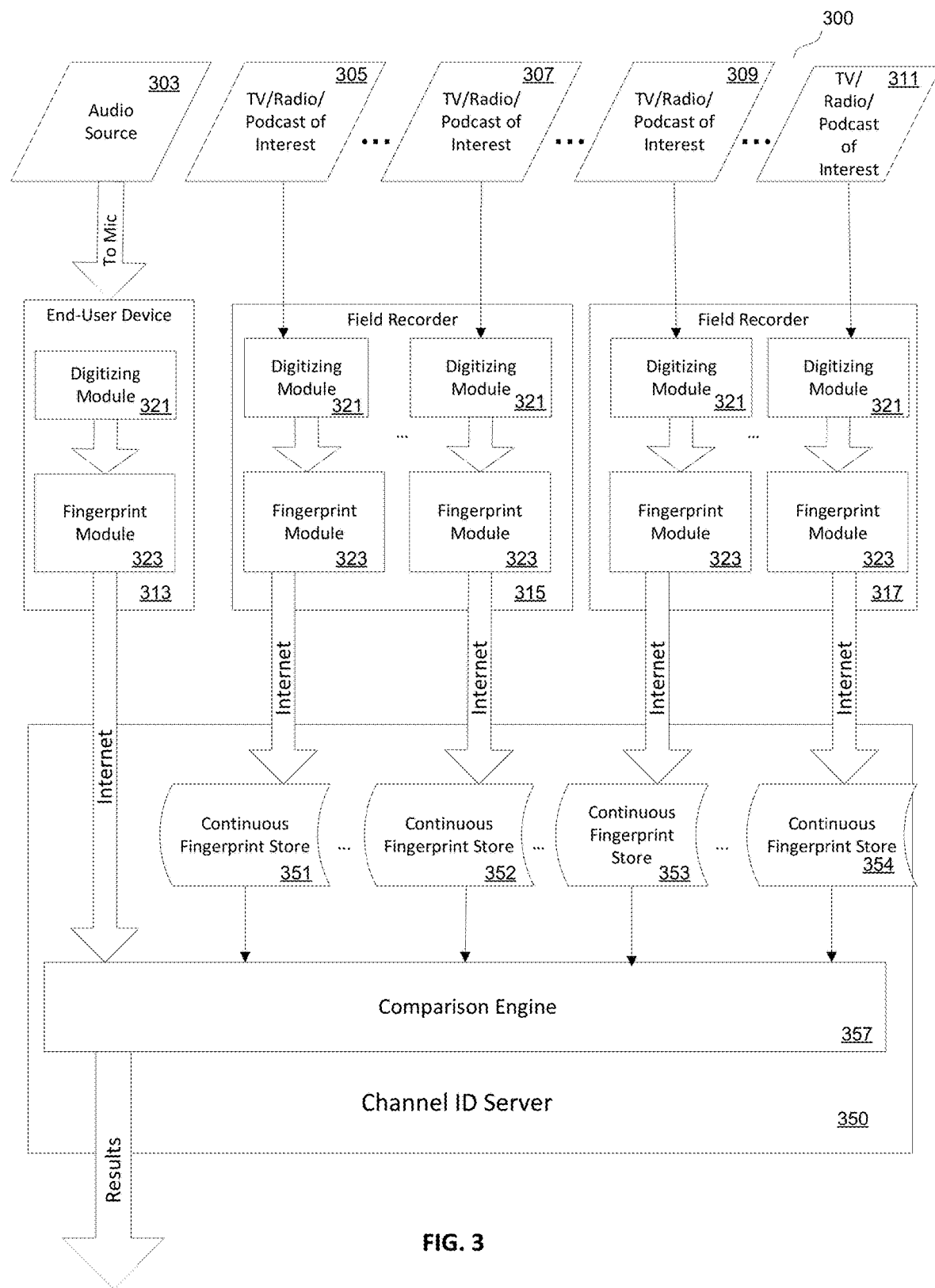
FIG. 3 illustrates a hardware system configured to implement embodiments of the present disclosure.

Referring next to FIG. 3 a system 300 according to various embodiments of the present disclosure is illustrated and discussed. System 300 illustrates an end-user device 313 capable of recording content generated by an audio source 303, and multiple field recorders 315 and 317 capable of obtaining content intended for presentation to users from various TV/radio/podcast of interest sources 305, 307, 309, and 311. System 300 also includes channel ID server 350, which receives content fingerprints from end-user device 313 and field recorders 315 and 317. Channel ID server 350 generates comparison results by matching the content from end-user device 313 field recorders 315 and 317.

End-user device 313 can include a microphone to record an audio source 303 currently being observed or listened to by an end-user. In at least one embodiment, audio source 303 may be a source external to end-user device 313, for example a portable radio, or a radio or television station playing at a store, restaurant, or other venue. In some embodiments, audio source 303 may be included in end-user device 313, such that end-user device 313 actually produces an audible signal from an audio source, such as a radio station, television station, podcast, or the like.

The audible signal produced by audio source 303 can be recorded by a microphone (not illustrated) in end-user device 313. The output of the microphone, which represents broadcast content presented to the user in a human perceptible format, can be delivered to digitizing module 321 where the analog recording is digitized for further analysis by end-user device 313. The digitized audio is delivered to fingerprint module 323, which analyzes the digitized audio from digitizing module 321, and generates a fingerprint. In at least some embodiments, this fingerprint is a spectral representation of the broadcast content generated by audio source 303.

The output of fingerprint module 323 can be delivered to channel ID server 350 for comparison with broadcast content representations provided by field recorders 315 and 317. The representation generated by fingerprint module 323, in at least one embodiment, can be delivered to channel ID server 350 via a cellular or telephone network, a wireless data network, a wired data network, a wide-area network, which may include any of various communication networks, such as the Internet.

In at least some embodiments, the output of fingerprint module 323 is delivered to channel ID server 350 in substantially real-time, and may be delivered along with a request from end-user device 313 to identify a station to which audio source 303 is tuned. In other embodiments, no request for station identification is transmitted from end-user device 313, although channel ID server 350 can still be used to identify the source, e.g. the radio or television station or channel, being listened to or otherwise viewed by the end user. In other words, end-user device 313 captures an audible signal generated by audio source 303, digitizes the audio signal in digitizing module 321, converts the digitized audio to a fingerprint in fingerprint module 323, and sends that fingerprint to channel ID server 350.

In some embodiments, the fingerprint of the broadcast audio content transmitted to channel ID server 350 by end-user device 313 corresponds to a predetermined length of broadcast content. For example, end-user device 313 can record 5 seconds of broadcast content from audio source 303, generate a representation of the 5 seconds of audio content, and transmit the representation to channel ID server 350, thereby allowing the representation corresponding to the 5 seconds of broadcast content to be compared with representations of broadcast content received from field recorders 315 and 317. If the representations provided by field recorders 315 and 317 match the representation provided by end-user device 313, channel ID server 350 outputs results indicating the match. In some embodiments, the results generated by channel ID server 350 include the identification of the station that was broadcasting the audio content recorded by both end-user device 313 and field recorders 315 and 317. In other embodiments a flag can be set, or an indicator transmitted, indicating generally, that the source of the 5 second snippet processed by end-user device 313 can be identified.

In some embodiments a channel identifier is sent to end-user device 313 for display. The channel identifier can be a station logo, a channel number, station call letters, or another suitable identifier. In some embodiments, the station identifier can be sent to end-user device 313, but is not displayed. In some such embodiments, end-user device 313 can store the station identifier and use it in conjunction with user profiles or other information to assist in performing searches, to assist in identifying or selecting music, video, or other content, etc.

In some embodiments, channel identifiers may or may not be delivered to end-user device 313, and are used in the aggregate. For example, channel identifiers can be collected in a database and used to analyze listenership data for particular channels or stations.

Various embodiments of the present disclosure can identify a broadcast source, and use the identity of the broadcast source to identify a specific media item being listened to by an end user, without resort to a database of known songs, television shows, or other content items. In other embodiments, even if a base media item is known, unknown altered media items can be identified, even though the altered media item is not known in advance of beginning a comparison between a fingerprint of the base media item and a fingerprint of broadcast content. Furthermore, various embodiments do not require timestamps, watermarks, or the like to correlate broadcast content captured, recorded, digitized and analyzed by end-user device 313, with content captured, recorded, digitized and analyzed by field recorders 315 and 317. Instead, the broadcast content received by end-user device can be correlated with broadcast content received by field recorders 315 and 317 at substantially the same time the field recorders and the end user device are receiving the broadcast content. In some implementations, even if there is a delay between the time end user device 313 receives the broadcast content, and the time when channel ID server 350 performs the comparison, or matching, no timestamps, watermarks, or the like are required, because the comparison performed is between two live broadcasts recorded at essentially the same time, rather than between a live broadcast and a database of discreet song signatures.

For example, field recorder 315 can record and process broadcast content received from multiple different stations, or TV/radio/podcast of interest sources 305 and 307. Each interest source 305 and 307 processed by field recorder 315 can be, in some embodiments, processed using separate processing paths that each include a digitizing module 321 and a fingerprint module 323. In other embodiments, the same hardware can be used to perform separate digitizing and fingerprinting of multiple different stations, such as interest sources 305 and 307. For example, where processing in the field recorders is performed using a system include a multicore processor, or multiple processors, multiple different stations can be processed efficiently in parallel. Furthermore, by employing multiple field recorders such as field recorder 315 and 317, fingerprints for numerous different stations, such as interest sources 305, 307, 309, and 311 can be generated in parallel.

For each station, such as interest sources 305, 307, 309, and 311 being processed, the broadcast content can be digitized in a digitizing module 321, and analyzed and converted to a representation of the digitized audio using fingerprint module 323. The digitizing modules 321 and fingerprint modules 323 included in field recorder 315 and 317 can be implemented in software, hardware, or various commendations thereof.

The output of field recorders 315 and 317 includes representations of broadcast content received from stations, such as interest sources 305, 307, 309, and 311, and is transmitted to channel ID server 350 for comparison with representations of broadcast content provided by end-user device 313. This comparison allows channel ID server 350 to determine which station of interest sourced 305, 307, 309, and 311, if any, correspond to audio source 303. As illustrated in FIG. 3, system 300 includes channel ID server 350, which in turn includes comparison engine 357 and continuous fingerprint stores 351, 352, 353, and 354. Each of the continuous fingerprint stores 351-354, is used to temporarily store fingerprints received from field recorders, where each fingerprint corresponds to a different station.

In at least one embodiment, comparison engine 357 is used to compare the fingerprint received from end-user device 313 with the fingerprints received from field recorders 315 and 317, thereby facilitating identification of the station to which end-user is listening, in this example audio source 303. The station to which end-user is listening can be identified by various embodiments, because each of the fingerprints stored in the continuous fingerprint store 351-354 corresponds to a fingerprint of substantially all content intended for human perception that was broadcast from stations, such as interest sources 305, 307, 309, and 311. The fingerprints stored in continuous fingerprint stores 351-354 can be compared concurrently, simultaneously, or generally at the same time as fingerprints from other continuous fingerprint stores are being compared to the fingerprint received from end-user device 313. In this way, the fingerprint recorded by end-user device 313 can be compared against the fingerprints of numerous different broadcast stations at the same time, thereby speeding the identification of the radio station or other station to which the end-user is listening.

Continuous fingerprint stores 351-354 are, in at least one embodiment, limited time cache memories used to store broadcast content representations from field recorders. Thus, each continuous fingerprint store 351-354 can be used to store, for example, representations corresponding to 30 seconds worth of broadcast content from a particular station. If the fingerprint received from and user device 313 matches the fingerprint of a particular station stored in the continuous fingerprint store 351-354, then comparison engine 357 identifies the station corresponding to the stored continuous fingerprint as the same station listen to by end-user device 313.

In some embodiments, field recorders 315 and 317 record audio content with a microphone, in a manner similar to that used by end-user device 313 to record the broadcast content from audio source 303. In other embodiments, field recorders 315 and 317 can include additional modules, software, circuitry, or combinations thereof to enable the field recorders to separate the intended human perceptible content from non-human perceptible content and to generate a spectral analysis, or other representation, of only the human perceptible broadcast content.

For example, digital broadcasts can include metadata such as song titles, and other data in addition to the content intended for human-perceptible presentation to audience members. In some embodiments field recorders, without actually generating audible, visual, or other content intended for perception by a user, can strip off the hidden metadata and other content not intended for presentation to a user, and generate a fingerprint based on substantially only the broadcast content intended for presentation to the user without actually reproducing the human-perceptible content.

It will be appreciated, that although primarily audio content and audio sources are discussed with respect to FIG. 3, other types of broadcast content can be recorded and processed to identify a station being observed by end-user. Thus, if an end-user is watching a particular television station, the broadcast content generated by the television can be recorded by a field recorder and end-user device 313. The broadcast content from the television station can be processed and compared by comparison engine 357 to permit identification of a television station being viewed by the end-user. This identification can be based on either the audio content, the video content, or some combination thereof. Similar techniques can be applied to identify broadcast stations received by a user over the Internet, podcasts, and the like. Identification based on tactile reproduction of broadcast content can also be performed according to at least one embodiment.

At least one embodiment of the present disclosure contemplates storing a limited quantity of data in continuous fingerprint stores 351-354, so that fingerprints received at channel ID server 350 from end-user device 313 are compared with essentially contemporaneous fingerprints recorded by field recorders 315 317. Thus, the comparison between the fingerprints from end-user device 313 and field recorders 315 317, can be compared in near real-time to provide a substantially current station identification.

In some cases, representations corresponding to an arbitrarily large time period can be stored in continuous fingerprint stores 351-354. Thus, for example, if audio source 303 is recorded by a DVR (not illustrated), and end-user device 313 is used to generate a fingerprint corresponding to a portion of broadcast content from audio source 303 that aired 3 hours prior to be being viewed, sufficient fingerprint data can be stored in one or more of the continuous fingerprint stores 351-354 to permit identification of audio source 303.

Using a continuous fingerprint store to identify a broadcast source differs from using a traditional database holding discrete broadcast elements to identify whether that exact discrete content item is included in a broadcast. Consider the case where an identical song is broadcast on two different radio stations at the same time, but on a first radio station a first disc jockey is talking over the song to announce a contest or prizewinner, while on a second radio station a second disc jockey is fading the song into another song, a spectral analysis of the two radio stations will not be the same, even though the same song is being played on both stations. Comparison of a fingerprint received from the end-user device 313 corresponding to the first radio station with a database of pre-stored fingerprints corresponding to discrete content elements would yield no match, because the fingerprint stored in the database would not include a representation of the song plus the voice overlay, or a representation of the song plus the fade. Various embodiments of the present disclosure, however, would yield a match between the fingerprint generated by the end-user device 313 and the fingerprint corresponding to the first radio station.

Figure 4:
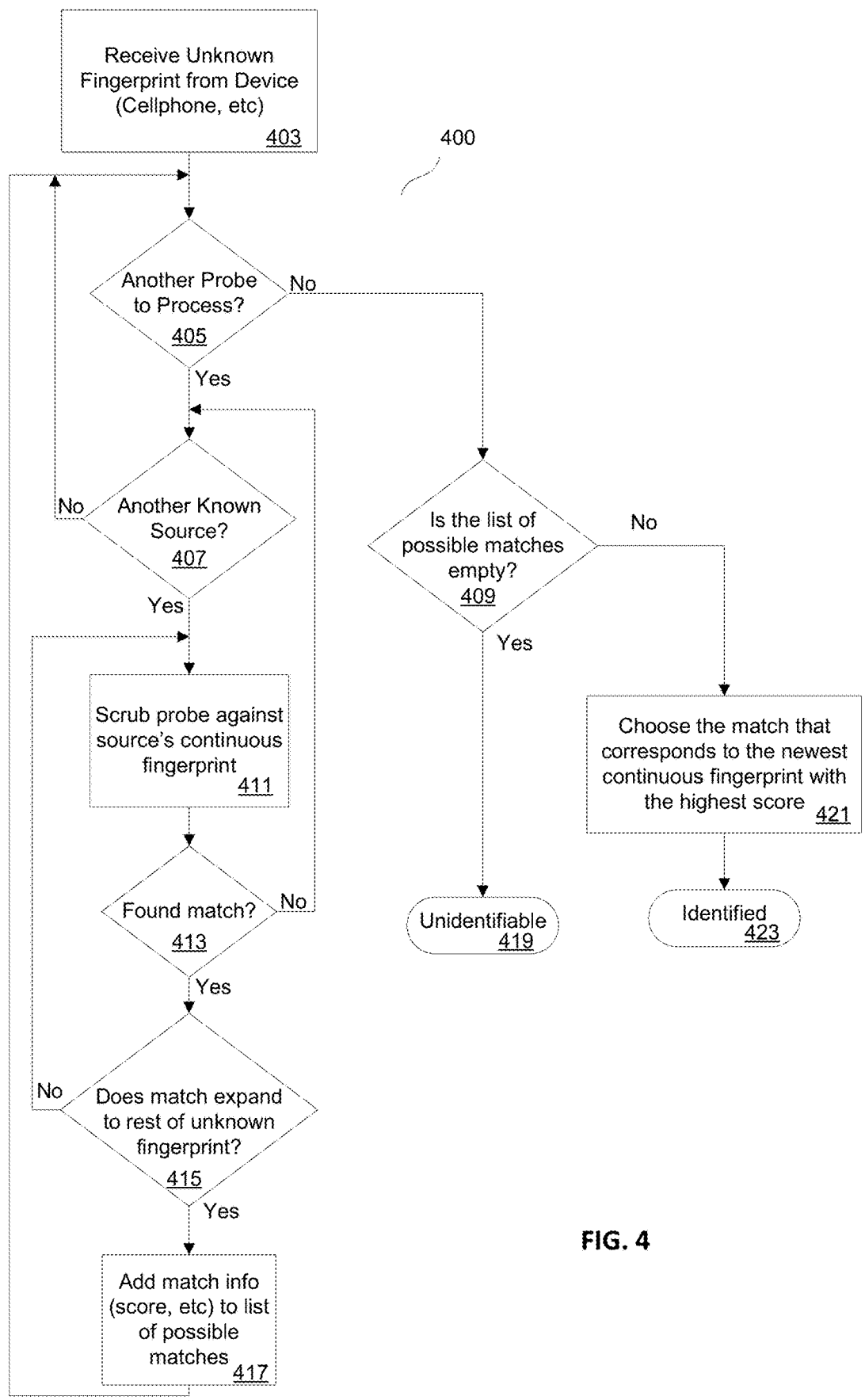
FIG. 4 is a flowchart illustrating a method according to embodiments of the present disclosure.

Referring next to FIG. 4, a method 400 will be discussed according to various embodiments of the present disclosure. As illustrated by block 403 a fingerprint representing a portion of a broadcast obtained from an unknown source, is received from an end user's device. The fingerprint can be conceptually, or actually, broken into smaller pieces called probes.

As illustrated by block 405, a determination is made regarding whether or not there is another probe process. In general, determining whether there is another probe to process refers to determining whether or not another portion of the fingerprint corresponding to the unknown source is to be compared against one or more known fingerprints stored in a continuous fingerprint store, or buffer.

As illustrated by block 407, if there are more probes to process, a determination is made at block 407 regarding whether or not there anymore fingerprints of known sources, against which to compare the fingerprint from the unknown source. If there are no fingerprints from known sources or stations to compare against the unknown fingerprint, the method proceeds back to block 405, where another check is made for additional probes to process.

If there are no more probes to process, and there are no other known sources to compare against the probes, method 400 proceeds to block 409. At block 409, a determination is made about whether the list of possible matches is empty; the list will be empty if no fingerprint from a known source or station had been matched to the fingerprint from the unknown source.

As illustrated by block 419, if no matches have been identified, i.e. the list of possible matches is empty, method 400 labels the fingerprint representing broadcast content from the unknown source as unidentifiable. As illustrated by block 421, if there are one or more potential matches in the list of possible matches, then the newest continuous fingerprint with the highest score is chosen as the best match. Some embodiments employ different criteria to determine the best match.

As illustrated by block 423, after a match has been chosen, method 400 marks the fingerprint from the unknown source as identified. Marking the fingerprint identified can include appending a station identifier to the fingerprint, sending a message to the user indicating the identity of the station he is listening to, sending the user, via a communication network, content selected based on the station identified, or the like.

Referring now to the output of block 407, the case where there are more probes to process and there are additional sources to compare with the unknown fingerprint will be discussed. As illustrated by block 411 the probe, or portion of the unknown fingerprint being processed, is compared against the continuous fingerprint of a known source. As illustrated by block 413, a determination is made regarding whether the probe matches a portion of the known, continuous fingerprint. If no match is found method 400 returns to block 407 to determine if there is another source to compare against the probe.

As illustrated by block 415, if a match is found between a probe and a portion of a known fingerprint, method 400 determines whether the rest of the unknown fingerprint matches the known fingerprint. This is sometimes referred to herein as "expanding the match."

As illustrated by block 417, if there the match between the probe of the unknown fingerprint and the known fingerprint can be expanded to verify that at least a threshold amount of the unknown fingerprint matches the fingerprint from the known source, match information is added to the list of possible matches. The information added to the list of possible matches can include one or more scores or other indicators of how well the fingerprint from the unknown source matches fingerprints from known sources, information about which sources matched, information about a time at which the matched content was being broadcast, the type of content matched, name of content item matched, information related to spots broadcast sponsors and advertisers, information linking the matched content to other content items deemed to be of interest to consumers of the matched content, length of the matched content, links to previously matched content, communication addresses, and the like.

Figure 5:
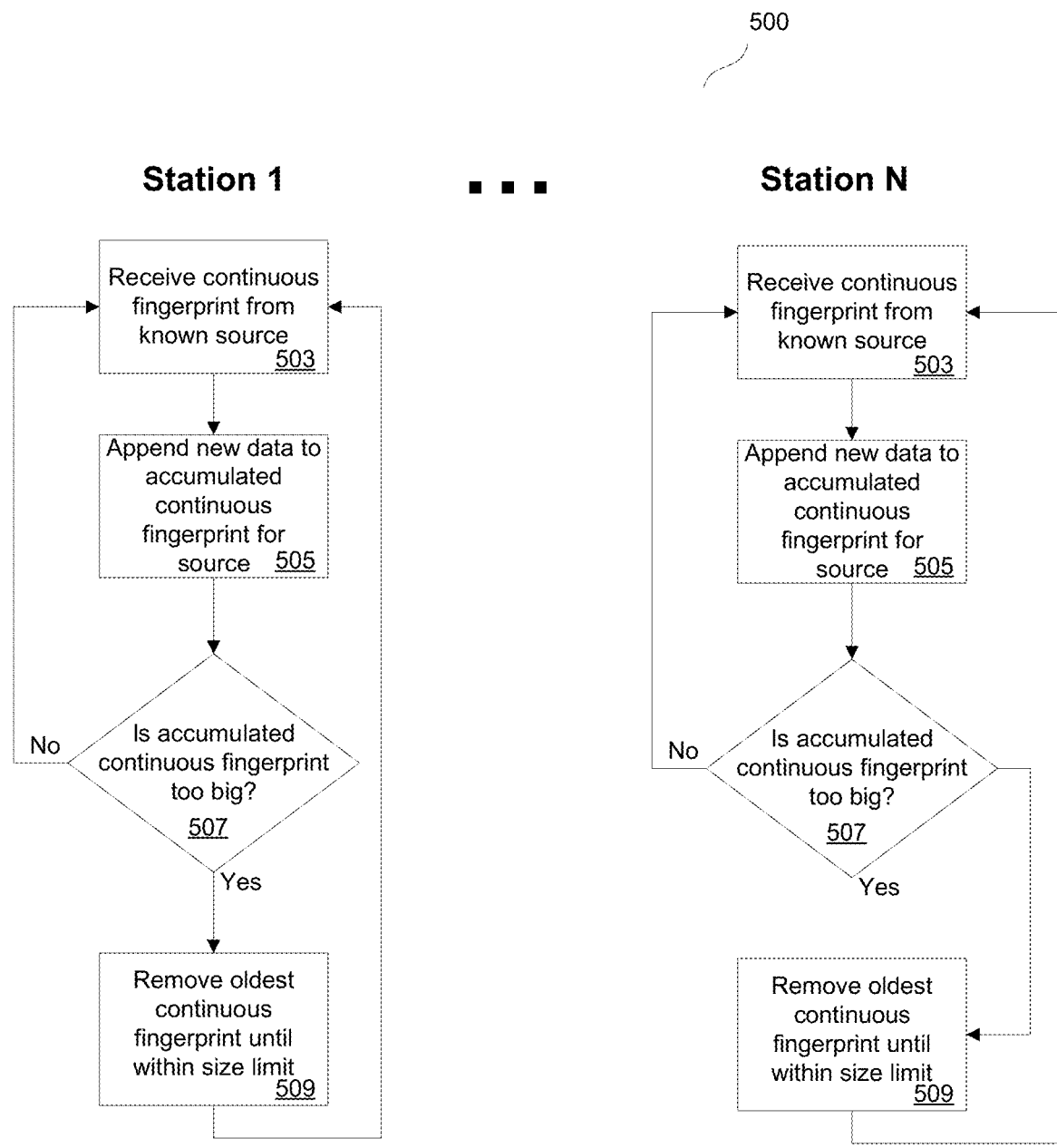
FIG. 5 is a flowchart illustrating parallel storage of broadcast content signatures into buffers, according to various embodiments of the present disclosure.

After adding match information to the list of possible matches, method 400 returns to block 405, and a decision is made regarding whether there is another probe process Referring next to FIG. 5, a method 500 illustrating concurrent, or parallel, accumulation of continuous fingerprints for multiple different broadcast sources is illustrated and discussed. As shown in FIG. 5, stations 1-N can be processed concurrently. At block 503, continuous fingerprints of broadcast content are received from known sources, for example radio or television channels, stations or the like. As illustrated by block 505, new data received from the known source can be appended to previous data received and accumulated in the continuous fingerprint source.

As illustrated by block 507, a check is made to determine whether the accumulated continuous fingerprint exceeds a threshold value established as the maximum size for data storage. In some embodiments for example a maximum size threshold for accumulated continuous fingerprint data can be set to an amount of fingerprint data corresponding to 30 seconds worth of broadcast content. In other embodiments, the threshold for accumulated continuous fingerprint data may be set to correspond to multiple days or weeks of broadcast content. As illustrated by block 509, if there is too much data in the accumulated continuous fingerprint, the oldest continuous fingerprint data can be removed until the accumulated continuous fingerprint buffer falls within the threshold size limit.

Figure 6:
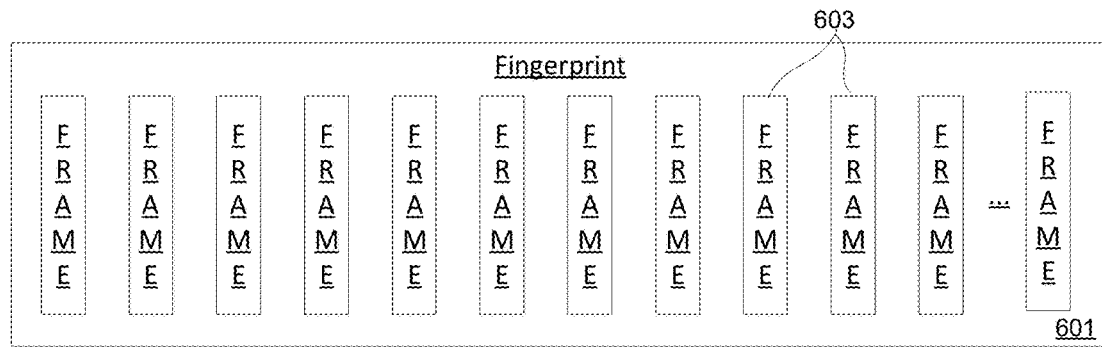
FIGS. 6-7 are diagrams illustrating the organization of fingerprints into frames, and frames into blocks, according to various embodiments of the present disclosure.
Figure 7:
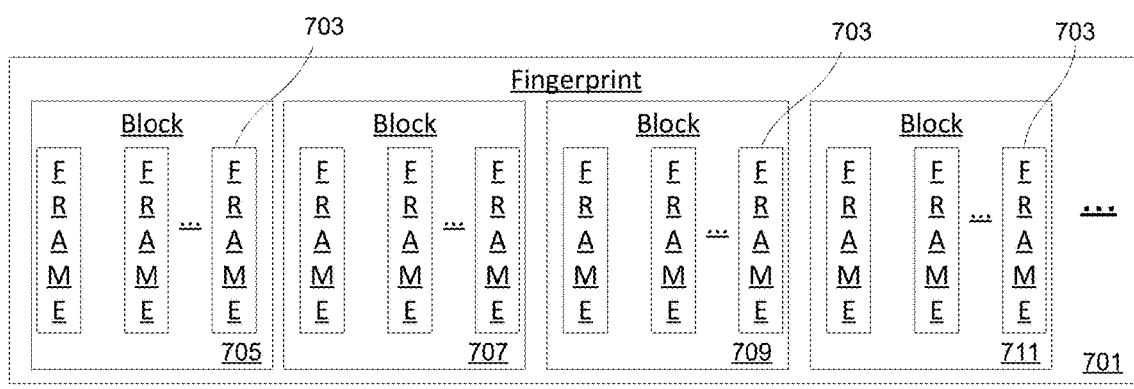

Referring next to FIGS. 6-7, a fingerprint such as that generated by either an end-user device or a field recorder is illustrated and discussed. In FIG. 6, a fingerprint 601 is shown logically, or in some cases physically, segmented into a number of frames 603. Different embodiments use different numbers of frames, and the number of frames 603 can be chosen based on the type of processing system, time constraints, or the accuracy desired. In at least one embodiment, a fingerprint consists of one 48-bit number for each 1/10 of a second of audio, in chronological order.

FIG. 7 illustrates a fingerprint 701, which has been divided into multiple frames 703, and the frames 703 have been grouped into blocks 705, 707, 709, and 711. In at least one embodiment a fingerprint being compared to another fingerprint may be expected to be "stretched" in time relative to one another. To compensate for this expected time stretch, the number of frames in each block is chosen to be the number of frames before a one-frame offset between the two fingerprints. For example, a 16 frame block corresponds to a maximum expected time-stretch of 6.25%, which has been empirically identified as a good choice for radio.

Figure 8:
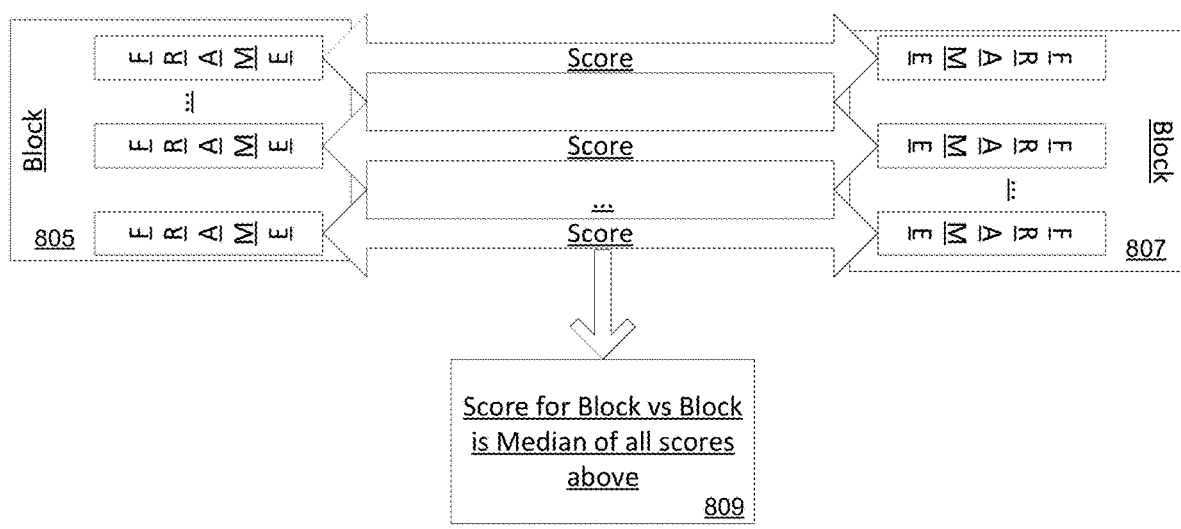
FIG. 8 is a diagram illustrating block by block scoring used in identifying matching broadcast content, according to various embodiments of the present disclosure.

As illustrated by FIG. 8, a score for each block 805 of an unknown fingerprint is compared against each block 807 of a known fingerprint by comparing each frame of block 805 against each from of block 807. The scores for each frame by frame comparison are then used to determine a block vs. block score 809. In at least one embodiment, the block vs. block score can be computed using the median, or another $k^{th}$ order function, of the individual frame vs. frame scores.

Figure 9:
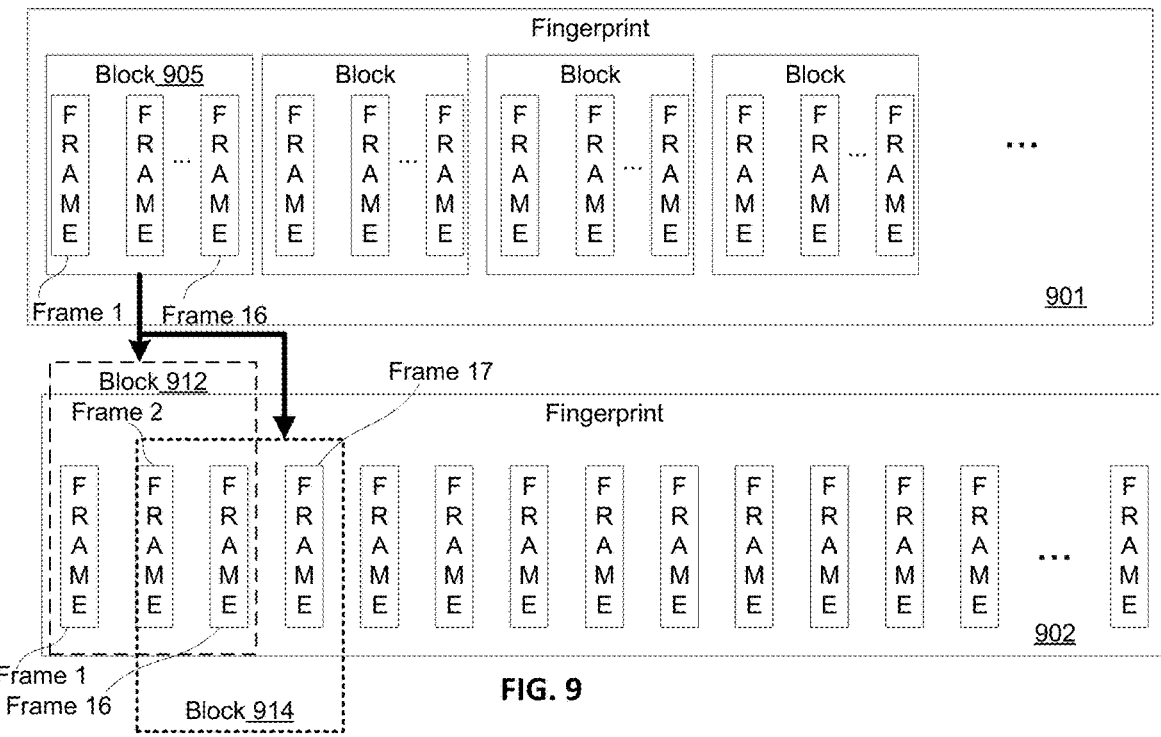
FIG. 9 is a diagram illustrating scrubbing a probe from an unknown fingerprint against a known fingerprint, according to various embodiments of the present disclosure.

Referring next to FIG. 9, comparing a probe of a fingerprint from an unknown broadcast source against a fingerprint from a known broadcast source will be discussed according to embodiments of the present disclosure. To "scrub a probe" from one fingerprint against another means that one segment of the fingerprint being identified, which in the illustrated embodiment is a block, is matched against each possible block of the other fingerprint, on a frame by frame boundary, against the other fingerprint until either the comparison yields a score that exceeds a threshold value, or a determination is made that the probe does not match.

For example, block 905 of fingerprint 901, which in this example includes 16 frames, is compared and scored against each possible block of 16 sequential frames of fingerprint 902 until the match score exceeds a threshold value indicating that the two blocks being compared might be a match. Thus, block 905 is compared first against block 912, then against block 914, and so on until a potential match is found, or until there are no more blocks to compare. Multiple block comparisons can be performed concurrently, rather than sequentially. The result of the scrub are the positions of two blocks, one from the unknown fingerprint and one from the known fingerprint, that match each other well.

Figure 10:
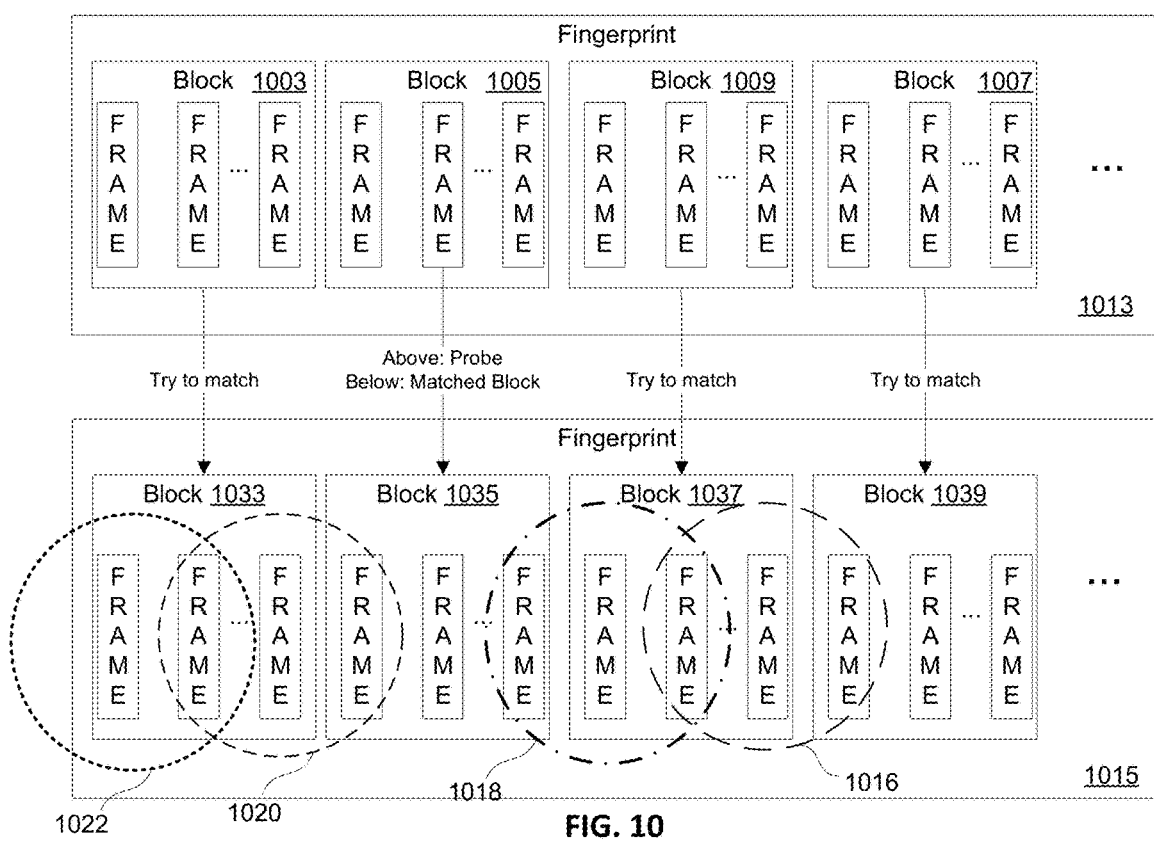
FIG. 10 illustrates growing a matching block to identify an unknown fingerprint, according to various embodiments of the present disclosure.

Referring next to FIG. 10, growing the matched probe according to various embodiments will be discussed. FIG. 10 illustrates blocks 1003, 1005, 1009, and 1007, which are included in fingerprint 1013, being compared against blocks 1033, 1035, 1037, and 1039, which are included in fingerprint 1015. Once two matching blocks have been identified, an attempt to grow the match is made by taking the block prior the probe and the block after the probe, and scoring those blocks against the corresponding blocks in the target fingerprint as well as the blocks defined by starting one frame earlier and one frame later.

Content from the unknown broadcast source may be time stretched longer, or time stretched shorter, so some embodiments implementing the matching process account for the time stretch by occasionally either skipping a tick in the target or matching it twice. The time stretching may be intentional, as in a radio station squeezing or stretching a song to hit an exact time marker, or unintentional such as the clock in the analog to digital converter being off specification.

To compensate for a time stretch difference between a reference and a target, some implementations attempt three different matches, and declare that a synchronization point in the target corresponds to the best scoring of the three attempted matches. By matching a 16-frame block from the reference to three pieces of the target, e.g. the 16 frames at the expected matching location as well as the 16 frames starting one frame earlier and one frame later. In this way, when a probe from the dead center of the reference matches the dead center of the target, the blocks of ticks at either end of the reference can match target ticks that are up to a predetermined distance away from where we would expect them to be if the audio was perfectly speed-synced between the reference and the target. In at least one embodiment, the predetermined distance is about 6.25%.

For example, assume that blocks 1005 and 1035 were identified as matching blocks by the procedure illustrated in FIG. 9. In some embodiments, Block 1003 is scored against block 1033, shifted block 1022, and shifted block 1020. The best of the three scores is selected, and defines the location for the next block to grow. Block 1009 is scored against block 1039, and shifted blocks 1018 and 1016 in a similar manner. Growth of the match is continued in each direction until the end of the fingerprint is reached, or until the scores fall below a threshold.

Consider, for example, the situation where a listening device encodes a station change. A score computed for each 16 frame block from the reference to the target might yield a progression of scores that run: high, high, high . . . low, low, low . . . . Various embodiments can conclude that the drop in scores was consistent with the reference station only for the length of high scoring matches, but not for the entire duration of the sample.

Figure 11:
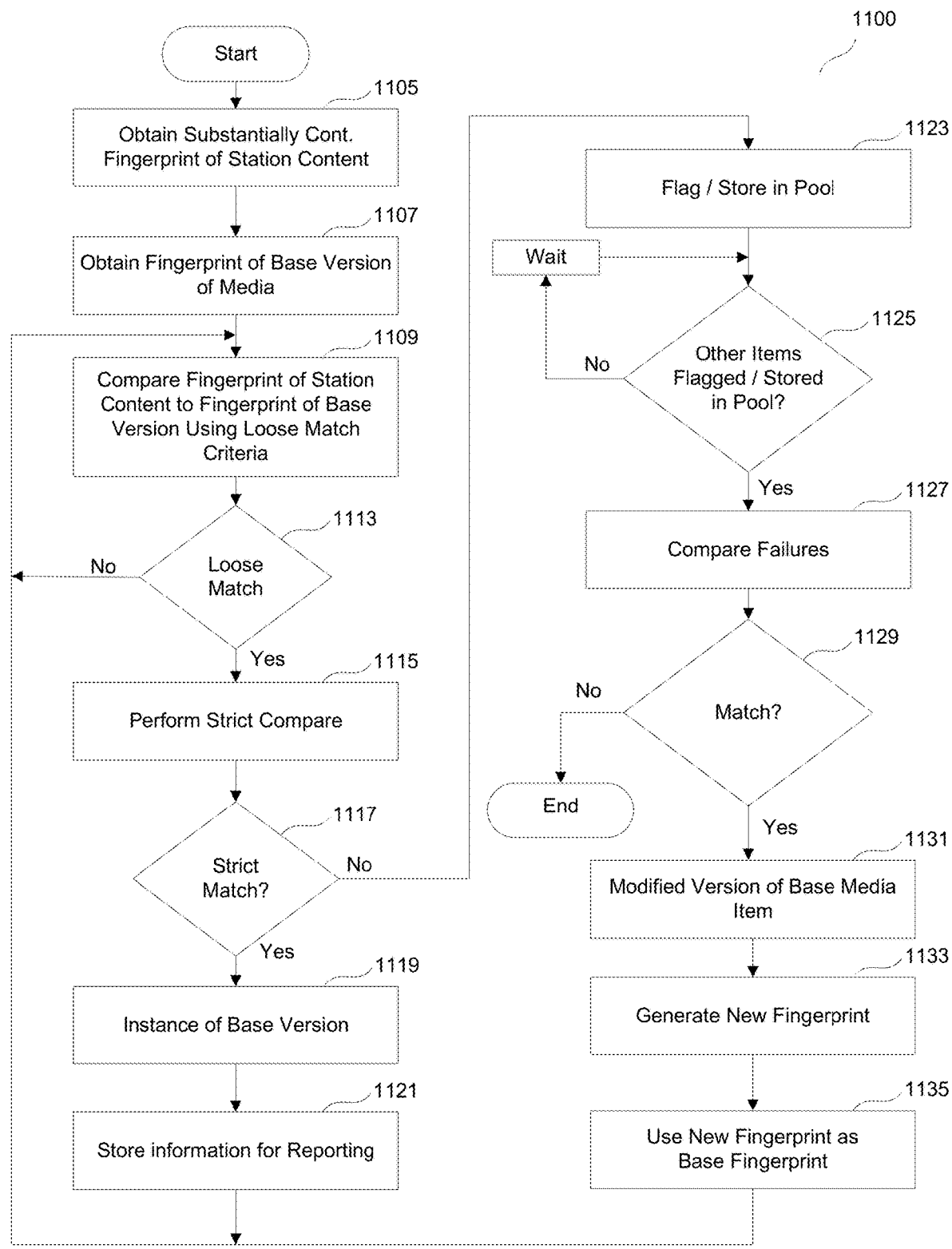
FIG. 11 is a flowchart illustrating a method of identifying and tracking altered media items included in a media broadcast, according to various embodiments of the present disclosure.

Referring now to FIG. 11, a method 1100 of identifying and tracking altered media items included in a media broadcast will be discussed according to various embodiments of the present disclosure. As illustrated at block 1105, a substantially continuous fingerprint of station content is obtained. The substantially continuous fingerprint can be a fingerprint of a limited time duration, for example a fingerprint of a daypart, hour, or day of a single media station, a continuously-updated fingerprint providing a fingerprint of a station's broadcast content on a "sliding" basis in real time, or otherwise. The substantially continuous fingerprint can be obtained directly from one or more field recorders, or from a service that generates the fingerprints from a station's broadcast content.

As illustrated at block 1107, a fingerprint of a base version of one or more media items, for example one or more advertisements, is obtained. In some embodiments, the fingerprint of the base version of the media item can be generated directly from a copy of the advertisement obtained from an advertiser or some other source. In other implementations, the fingerprint of the base version of the media item can be obtained indirectly from a broadcast captured using a field recorder, or end user device.

As illustrated at block 1109, the continuous fingerprint can be compared to the fingerprint of the base version of the media item using loose match criteria. The loose match criteria can be selected so that matches indicate that the fingerprints being compared match to a given level of certainty. For example, if at least 50% of the blocks match identically, that could indicate a 75% chance that the base media item matches a given portion of the continuous fingerprint. In other instances, if 75% of the blocks are each 75% matches to each other, then the likelihood that the two fingerprints being compared are fingerprints of the same media item is increased. In other embodiments, any out of order blocks, even if the blocks are perfect matches individually, could indicate a less than 50% chance that the two fingerprints being compared are fingerprints of the same media item. In at least one embodiment, a loose match indicates at least a 75% chance that the base media item matches a discrete media item represented by the portion of the continuous fingerprint being compared. In other embodiments, a loose match can be set to 85%, or another suitable value. Setting the loose match to a lesser certainty can have the effect of identifying more fingerprint portions for additional consideration, but can conserve processing resources used to identify the loose matches.

As illustrated at block 1113, a determination is made, based on the comparison, about whether or not the two fingerprints being compared satisfy the criteria to be a loose match. If not, block 1113 can return to block 1109, where the fingerprint of the base version of the media item can be compared to another portion of the substantially continuous fingerprint of the broadcast content of one or more stations.

If the determination at block 1113 indicates a loose match, a second comparison between the same two fingerprints can be performed using stricter matching criteria, as illustrated at block 1115. For example, if the loose match criteria requires 79% of the blocks in the fingerprints to match, the stringent criteria applied at block 1115 can require that 88% of the blocks included in the fingerprints match. Similarly, if the loose match criteria require 75% of the blocks to match exactly, but allows 25% of the blocks to include 8 frames that do not match, the stringent criteria can require 90% of the blocks to match exactly, and allow the remaining 10% of the blocks to include only 2 non-matching frames.

It should be noted that either or both of the loose-match criteria and the stringent-match criteria can include a margin of error to account for broadcast artifacts and errors such as transmission errors, noise, playback speed, or the like. Thus, for example in many embodiments a match can allow for a 1%-5% margin of error, meaning that an exact match can refer to a match range of 95% to 99%. In other embodiments, different margins of error can be allowed. These margins of error can be determined, for example, based on a Hamming distance between the fingerprints or portions of fingerprints, based on a number of non-matching frames, a number of non-matching blocks, or as otherwise discussed herein.

As illustrated at block 1117, if the strict, or stringent, comparison of block 1115 indicates a strict match, the portion of the substantially continuous fingerprint under consideration can be designated as a broadcast instance of the base version of the media item, as illustrated by block 1119. Markers and identifiers can be inserted in the substantially continuous fingerprint in some embodiments. As illustrated at block 1121, information regarding the station, time, match percentage, item identifier, fingerprint identifier, or similar information can be stored for reporting and billing purposes. Method 1100 can then return to block 1109, where comparison of the fingerprint of the base version to other portions of the substantially continuous fingerprint continues.

If the strict comparison of block 1115 fails to indicate a match, the portion of the continuous fingerprint that passed the loose match, but failed the strict match, can be flagged and/or stored in a pool of failed loose matches, as illustrated by block 1123. These failed loose matches are referred to herein as potentially-altered matches. As illustrated at block 1125, a check is made to determine if any potentially-altered matches have been flagged or stored in the pool of failed loose matches. If not, method 1100 waits until another potentially-altered match is added to the pool of failed loose matches.

As illustrated at block 1127, if there are multiple potentially-altered matches in the pool of failed loose matches they can be compared to each other at block 1129 to determine if the potentially-altered matches match each other. In at least one embodiment, if the match performed at block 1129 indicates that the items being compared do not match each other, method 1100 ends. However, if the matching process performed at block 1129 indicates that the items being compared match each other, either or both of the matches can be flagged as a modified version of the base media item, as illustrated by block 1131. The modified versions flagged at block 1131 are sometimes referred to herein as "flagged matches." Note that when generating a flagged match, a flag can be appended or prepended to a fingerprint file or to a fingerprint file identifier, or a separate flag or marker can be linked to the fingerprint file or fingerprint file identifier.

The matching process of block 1129 need not use the same matching criteria used in previous comparison steps, but in at least one embodiment the match process of block 1129 uses the strict or stringent criteria used at block 1117. Consider a case in which a base advertisement has been modified, and the modified version of the advertisement is being used as a replacement for the base version of the advertisement. In general operation the modified version of the advertisement will loosely match the base version of the advertisement, but not match the base version strictly. If multiple instances of the modified version of the advertisement are broadcast, those instances should each be placed in the pool of failed loose matches. Multiple instances of the same item in the pool of failed loose matches can indicated that the modified version of the advertisement is being broadcast in place of the base version of the advertisement, or that the modified version of the advertisement is being broadcast in addition to the base version of the advertisement.

As illustrated at block 1133, in response to generating a flagged match at block 1131, in some embodiments a new fingerprint representing the altered version of the advertisement can be generated, and then used for comparison with the substantially continuous fingerprint of station content to identify broadcast instances of the altered version of the advertisement, as illustrated at block 1135. In various implementations, additional alterations to a base advertisement can be identified by performing comparisons using either or both the fingerprint of the base version of the advertisement and the fingerprint of the altered version of the advertisement.

Figure 12:
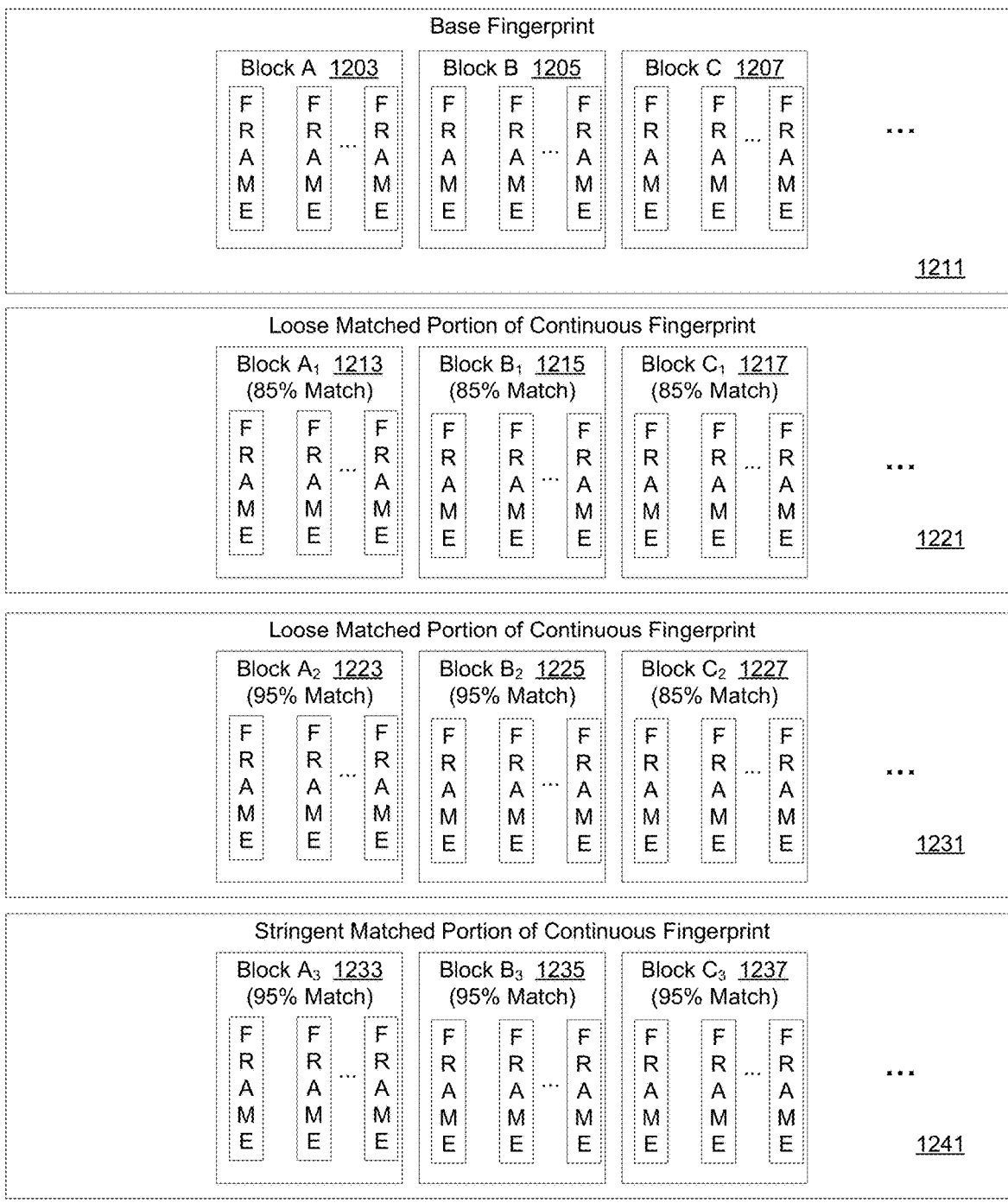
FIG. 12 is a block diagram illustrating a base fingerprint along with loosely and stringently matched portions of a continuous fingerprint, according to various embodiments of the present disclosure.

Referring now to FIG. 12, relationships between a base fingerprint, and loosely and stringently matched portions of a continuous fingerprint will be discussed according to various embodiments of the present disclosure. Base fingerprint 1211 is shown divided into three blocks: Block A 1203, Block B 1205, and Block C 1207. Each of the three blocks is further divided into frames. The Block/Frame structure of fingerprints, as well as specifics regarding how blocks can be compared and scored, has been discussed previously with respect to FIGS. 6-9.

A portion of a continuous fingerprint that satisfies loose match criteria according to one embodiment is illustrated as loose matched portion of continuous fingerprint 1221. The loose match criteria in the current example specifies that each block of loose matched portion of continuous fingerprint 1221, e.g. Block $A_1$ 1213, Block $B_1$ 1215, and Block $C_1$ 1217 must match corresponding Block A 1203, Block B 1205, and Block C 1207 of base fingerprint 1211 to an 85% certainty.

The loose match criteria in another embodiment can specify that at least two of the blocks included in loose matched portion of continuous fingerprint 1231, e.g. Block $A_2$ 1223 and Block $B_2$ 1225, must match corresponding Block A 1203 and Block B 1205 of base fingerprint 1211 to a 95% certainty, while Block $C_2$ 1227 of loose matched portion of continuous fingerprint 1231 is allowed to match corresponding Block C 1207 of base fingerprint 1211 to only an 85% certainty.

Stringent match criteria for either example of loose matched portion of continuous fingerprint 1221 or 1231 discussed above, can require each block of stringent matched portion of continuous fingerprint 1241, e.g. Block $A_3$ 1233, Block $B_3$ 1235, and Block $C_3$ 1237 must match corresponding Block A 1203, Block B 1205, and Block C 1207 of base fingerprint 1211 to an 95% certainty.

Various combinations of loose and stringent match criteria can be used in various different embodiments. As previously discussed, any fingerprints that satisfy loose match criteria but fail to also meet the stringent match criteria can be placed in a pool of failed loose matches for later comparison with each other. Also recall that items in the pool of failed loose matches are sometimes referred to herein as potentially-altered media items or potentially-altered advertisements.

Figure 13:
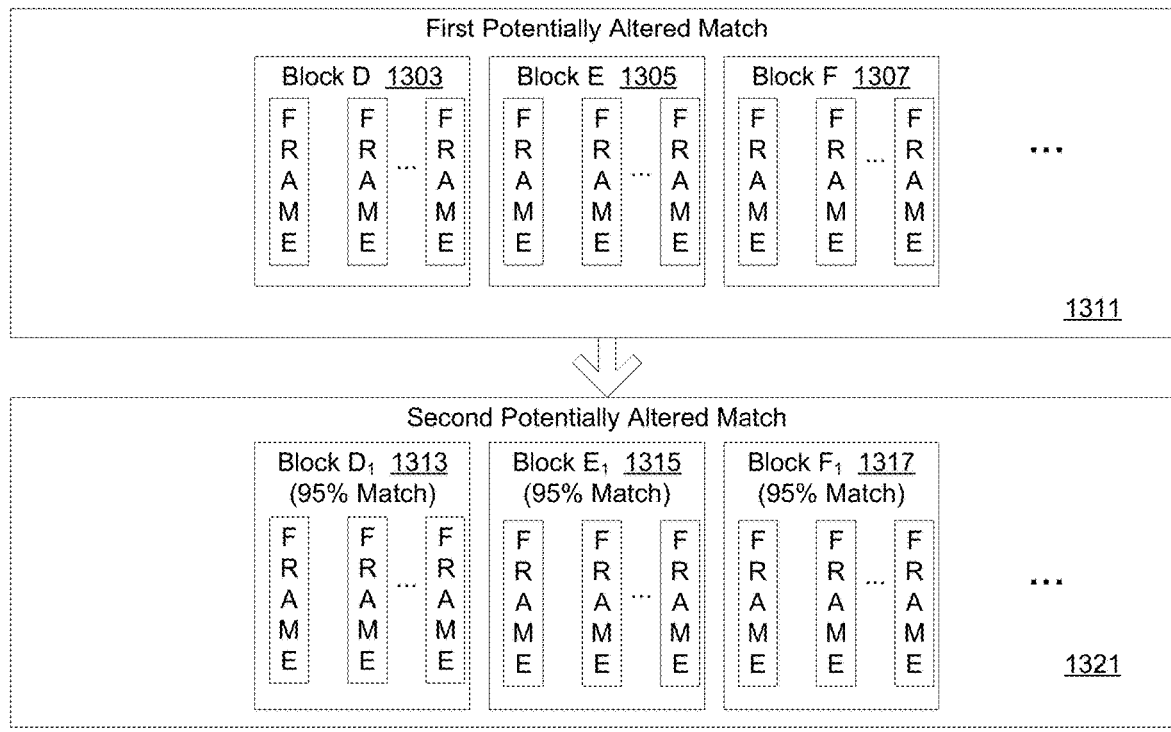
FIG. 13 is a block diagram illustrating matched fingerprints of potentially-altered media items, according to various embodiments of the present disclosure.

Referring now to FIG. 13, matched fingerprints of potentially-altered media items will be discussed according to various embodiments of the present disclosure. As illustrated in FIG. 13, first potentially-altered match 1311 can be compared to second potentially-altered match 1321. In at least one embodiment the same stringent match criteria used to evaluate loose matches can be used. In the illustrated embodiment, for a fingerprint to be considered matching, the stringent match criteria can require each block of second potentially-altered match 1321, e.g. Block $D_3$ 1313, Block $E_1$ 1315, and Block $F_1$ 1317 must match corresponding Block D 1303, Block E 1305, and Block F 1307 of first potentially-altered match 1311 to an 95% certainty.

Various different matching criteria can be used without departing from the sprit and scope of the present disclosure, and in some embodiments the loose match criteria, the stringent match criteria, or both can be adjusted over time based on empirical data related to a particular station, a particular type of station, particular times of day, etc. For example, if experience indicates that a particular station employs stretching or compression techniques that results in even identical media items failing to satisfy either the loose or stringent match thresholds, those thresholds can be adjusted to add an additional margin of error to account for the affects the matching process for that particular station. Similar adjustments to matching criteria can be made a type of station basis, for example different thresholds can be employed for streaming media stations versus over air broadcast stations.

Figure 14:
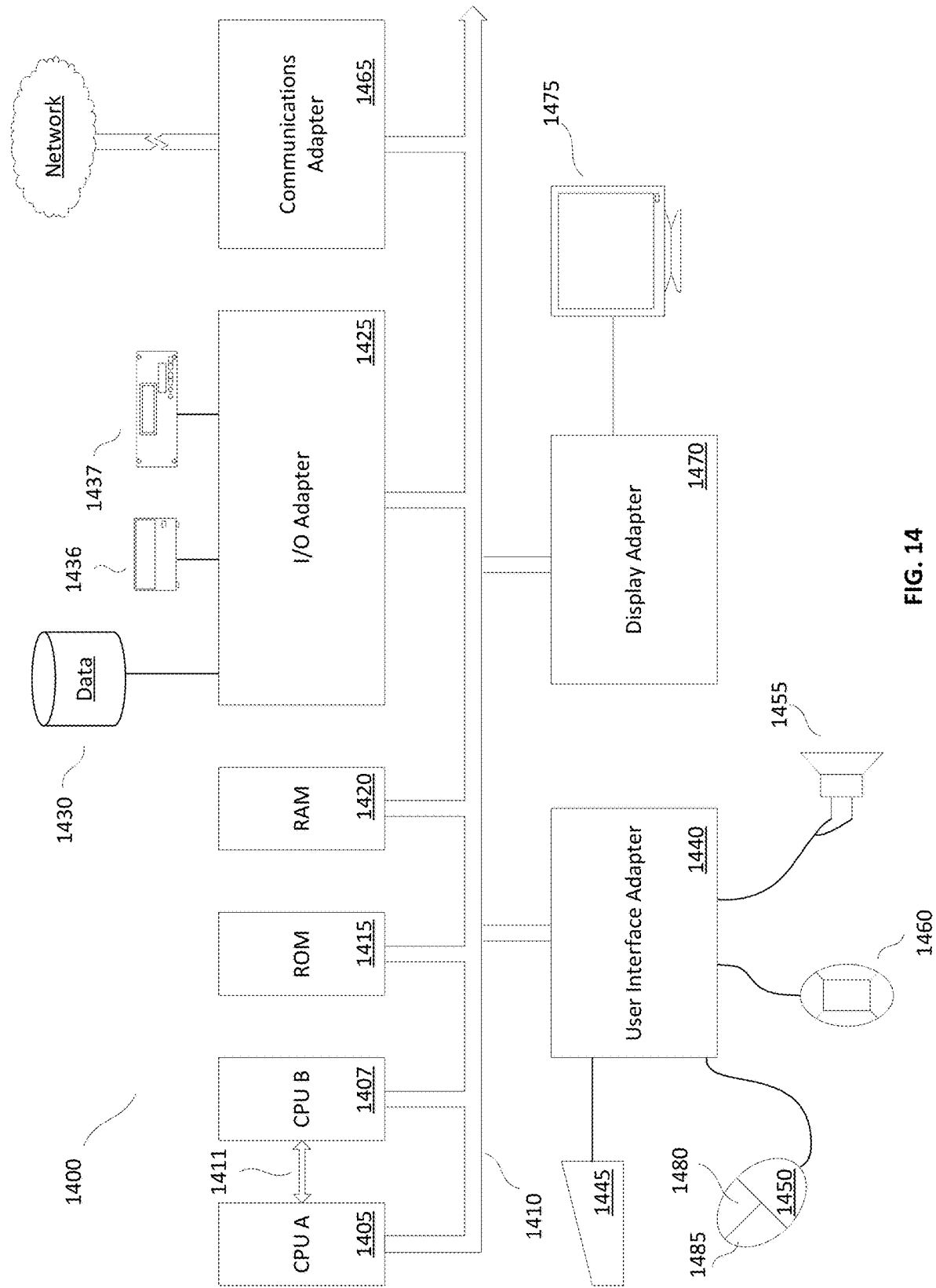
FIG. 14 is a high level block diagram of a processing system, such as a server, according to an embodiment of the present disclosure.

Referring next to FIG. 14, a high-level block diagram of a processing system is illustrated and discussed according to various embodiments of the present disclosure. Processing system 1400 includes one or more central processing units, such as CPU A 1405 and CPU B 1407, which may be conventional microprocessors interconnected with various other units via at least one system bus 1410. CPU A 1405 and CPU B 1407 may be separate cores of an individual, multicore processor, or individual processors connected via a specialized bus 1411. In some embodiments, CPU A 1405 or CPU B 1407 may be a specialized processor, such as a graphics processor, other co-processor, or the like.

Processing system 1400 includes random access memory (RAM) 1420; read-only memory (ROM) 1415, wherein the ROM 1415 could also be erasable programmable read-only memory (EPROM) or electrically erasable programmable read-only memory (EEPROM); and input/output (I/O) adapter 1425, for connecting peripheral devices such as disk units 1430, optical drive 1436, or tape drive 1437 to system bus 1410; a user interface adapter 1440 for connecting keyboard 1445, mouse 1450, speaker 1455, microphone 1460, or other user interface devices to system bus 1410; communications adapter 1465 for connecting processing system 1400 to an information network such as the Internet or any of various local area networks, wide area networks, telephone networks, or the like; and display adapter 1470 for connecting system bus 1410 to a display device such as monitor 1475. Mouse 1450 has a series of buttons 1480, 1485 and may be used to control a cursor shown on monitor 1475.

It will be understood that processing system 1400 may include other suitable data processing systems without departing from the scope of the present disclosure. For example, processing system 1400 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a non-transitory computer-usable or computer-readable medium embodying program code for use by, or in connection with, a computer, a processor, or other suitable instruction execution system.

For the purposes of this description, a computer-usable or computer readable medium can be any tangible apparatus or device that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments have been described for identifying an unknown broadcast source based on comparison of a representation of the broadcast source with a representation of a known continuous broadcast source. Other variations and modifications of the embodiments disclosed may be made based on the description provided, without departing from the scope of the invention as set forth in the following claims.

What is claimed is:

1. A method for identification of a broadcast:
    capturing, by one or more recording devices, a plurality of continuous signature representations included as a portion of one or more broadcasts from one or more broadcast sources;
    storing, temporarily in separate buffers, each of the plurality of continuous signature representations;
    receiving, by a mobile device, a broadcast from the one or more broadcast sources;
    analyzing the broadcast to determine at least one unknown signature representation;
    delivering, to a cloud computing component, the at least one unknown signature representation; and
    comparing the at least one unknown signature representation with each of the plurality of continuous signature representations; and
    identifying any potential matches between the at least one unknown signature representation and the plurality of continuous signature representations.

2. The method of claim 1, wherein the potential matches include any of: loose or strict comparisons, or comparisons between failed loose comparisons.

3. The method of claim 1, wherein the identification of any potential matches includes identifying any of: a channel, a station, or a source.

4. The method of claim 1, wherein the identification of any potential matches includes any of: an altered version of a media item or an advertisement.

5. The method of claim 1, wherein the one or more broadcasts originate from any of: a broadcast radio station, a television station, a streaming video channel, or a streaming audio channel.

6. The method of claim 1, wherein the one or more broadcasts include broadcasts originating from any of: Internet, communication networks, analog radio frequency broadcasts, digital radio frequency broadcasts, terrestrial broadcasts, satellite radio and television stations.

7. The method of claim 1, wherein the mobile device includes any of: a tablet, a personal digital assistant, or a mobile phone.

8. The method of claim 1, wherein the at least one unknown signature is a fingerprint.

9. The method of claim 1, wherein the capturing, by the one or more recording devices is implemented by any of: a monitoring service or a service provider.

10. The method of claim 1, wherein the recording devices are field recorders.

11. The method of claim 1, wherein the plurality of continuous signature representations captured by the one or more recording devices is delivered to a repository.

12. The method of claim 11, wherein the repository includes any of: a central, a regional server system, a data storage site, a service provider computer system, or a storage local to each of the recording devices.

13. The method of claim 12, wherein the data stored in the repository includes records corresponding to discreet content items including any of: songs, videos, images, unanticipated, unscripted, or content that may be unknowable until the broadcast is generated.

14. The method of claim 1, wherein the separate buffers, include any of: a FIFO (first-in-first-out) or LIFO (last-in-first-out) buffer.

15. The method of claim 1, wherein the plurality of continuous signature representations include any of: audio signatures of advertisements, disc jockey chatter, listener telephone calls, viewer telephone calls, real-time audio content, custom mixed audio content, or prerecorded songs and live content.

16. The method of claim 1, wherein the analyzing includes a spectral analysis performed on content of the one or more broadcasts intended to be reproduced in human perceptible form.

17. A system for identification of a broadcast, the system includes:
    a processing device connected to a communications network, wherein the processing device is configured to:
    receive from one or more recording devices, a plurality of continuous signature representations included as a portion of one or more broadcasts;
    store, temporarily in separate buffers, each of the plurality of continuous signature representations;
    receive a cloud callout from a mobile device to match at least one unknown signature representation;
    compare the at least one unknown signature representation with each of the plurality of continuous signature representations; and
    identify any potential matches between the at least one unknown signature representation and the plurality of continuous signature representations to identify.

18. The system of claim 17, wherein the processing device includes any of: a regionally located server, a nationally located server, or a server local to a sub community.

19. The system of claim 17, wherein identifying any potential matches includes analyzing the broadcast by performing a spectral analysis on all broadcast content intended to be reproduced in human perceptible form.

20. The system of claim 17, wherein the cloud callout is used to perform any of: loose comparisons, stringent comparisons, comparisons between failed loose comparisons.

* * * * *